Patented Dec. 6, 1949

2,490,677

UNITED STATES PATENT OFFICE 2,490,677

AQUEOUS DISPERSION OF A SALT OF AN N-MONOALKYL SUBSTITUTED POLYMERIC AMIC ACID

Martin E. Cupery, Wilmington, Del., assignor to E. I. du Pont de Nemours & Company, Wilmington, Del., a corporation of Delaware No Drawing. Application April 19, 1946, Serial No. 663,642

8 Claims. (Cl. 260—29.6)

This invention relates to coating compositions and to processes for treating articles therewith. More particularly this invention relates to compositions containing novel dispersing agents, to coated articles and to methods for rendering articles water insensitive.

Heretofore, coatings applied from aqueous dispersion systems have not been entirely satisfactory because the coatings do not become truly insensitive to water after air-drying or heat treatments. For example, there has been a decided trend during recent years toward the more extensive use of cold water paints for interior decoration, especially for refinishing wall-paper. These cold water paints have certain advantages over ordinary paints containing volatile organic solvents and drying oils, such as freedom from odor, lower cost, and safety in handling through elimination of the organic solvent. They are also advantageous in that they dry within a relatively short period. However, these cold water paints have been deficient in that the resulting films are not sufficiently water-resistant and hence are not truly washable. Furthermore, they have been susceptible to can failure because of the presence of casein or similar proteinous dispersing materials.

It is an object of this invention to provide coating compositions containing novel dispersing agents. A further object is to provide a method for treating articles with aqueous dispersions employing novel dispersing agents. A still further object is to provide a method for treating surfaces with aqueous dispersions employing dispersing agents which do not impart water sensitivity to said surfaces. An additional object is to provide a method for treating bibulous surfaces with aqueous dispersions comprising dispersing agents which are readily inactivated and become water insoluble. Another object is to provide a method for treating surfaces with an aqueous dispersion comprising as the dispersed phase a film-forming material and as a dispersing agent a water-soluble compound which is readily inactivated to become water-insoluble. Still another object is to provide films and coatings having superior resistance to water and articles containing such coatings. Other objects will appear hereinafter.

These objects are accomplished by a composition containing in aqueous dispersion a water-soluble salt of the class of ammonium and water-soluble basic amine salts of a N-monoalkyl substituted polymeric amic acid. It has now been discovered that water-soluble salts of the class of ammonium and basic amine salts of N-monoalkyl substituted polymeric amic acids in which the recurring two non-oxo-carbonyl groups are attached directly to adjacent carbon atoms of the polymeric chain yield excellent aqueous dispersions which are stable in aqueous solution and that films deposited from these dispersions after inactivation of the polymeric amic acid dispersing agent are remarkably water-insensitive. The dispersing agents of this invention thus possess the transitory property of being water-soluble and forming stable dispersions until deposited in films and air-dried or baked when they lose their water-solubility and become water-insoluble. The term aqueous dispersion includes dispersions in aqueous solutions of ammonia or water-soluble basic amines.

By "basic amine" is meant an amine having an ionization constant value greater than $1 \times 10^{-6}$, when measured at 25° C.

By "water-soluble amine" is meant an amine which is soluble to the extent of at least 5 parts per 100 parts of water at 25° C.

Examples of water soluble basic amines are methylamine, ethylamine, diethylamine, ethanolamine, hydrazine, piperidine, morpholine, and the like.

In this invention it is preferable to use an ammonium or basic amine salt of a short chain N-monoalkyl substituted polymeric amic acid or the ammonium or basic amine salt of a mixed N-monoalkyl substituted polymeric amic acid in which some of the amide nitrogen atoms have a short chain monoalkyl substituent and other of the amide nitrogen atoms have a long chain monoalkyl substituent. By "short chain N-monoalkyl substituted" is meant that a single alkyl group containing less than seven carbon atoms is attached to the amide nitrogen of the polymeric amic acid. By "long chain N-monoalkyl substituted" is meant that a single alkyl group containing at least seven carbon atoms is attached to the amide nitrogen of the polymeric amic acid.

Articles having superior repellency to water are formed by contacting the article with a dispersion containing as the dispersing agent a water-soluble ammonium or basic amine salt of an N-monoalkyl substituted polymeric amic acid, drying the treated article and then treating the article under conditions such as to bring about inactivation of the dispersing agent and conversion to a water-insoluble form. The conditions required to bring about insolubilization of the polymeric amic acid ammonium or basic amine salt dispersing agents vary to some extent with the particular polymeric amic acid employed. Although inactivation can be brought about by prolonged exposure of the treated article at ordinary temperatures, it is preferred to heat or bake the treated article at elevated temperatures of approximately 50° to 250° C., because of the shortened time required to inactivate and convert the polymeric amic acid dispersing agent to an insoluble form.

The N-monoalkyl substituted polymeric amic acids, which function as dispersing agents in the form of their water-soluble ammonium and basic amine salts, are obtainable by the amidation with a primary alkylamine of a polymeric polycarboxylic acid anhydride. In the amidation, it is preferred to employ one mole of a short chain primary alkylamine per mole equivalent of the polymeric polycarboxylic acid anhydride. It is to be understood, however, that proportions outside this amount can be used. Thus these N-alkyl polymeric amic acids can be conveniently made by suspending the polymeric polycarboxylic acid anhydride in an organic solvent, such as benzene, and adding to the suspension a short chain primary alkylamine, such as for example, butylamine. Typical short chain alkylamines which can be used are ethylamine, propylamine, isopropylamine, butylamine, amylamine and the like.

If desired, long chain primary alkyl amines or mixtures of short chain primary alkyl amines with long chain primary alkyl or primary aromatic amines can be used to produce mixed N-substituted polymeric amic acids. Where a mixture of a short chain primary alkylamine and a long chain primary alkylamine or a primary aromatic amine is used, the resulting mixed N-substituted polymeric amic acid will have some of the amide nitrogen atoms in the polymer attached to a short chain monoalkyl substituent and other of the amide nitrogen atoms in the polymeric chain attached to a long chain monoalkyl substituent or to a monoaryl substituent.

An alternative method which is particularly applicable for the preparation of long chain N-alkyl polymeric amic acids consists in dissolving the polymeric acid anhydride in a suitable organic solvent, such as methyl ethyl ketone, and adding the long chain primary alkylamine with stirring. The N-alkyl polymeric amic acid thus obtained in suspension in the reaction medium is treated with ammonia or dilute aqueous ammonium hydroxide or water-soluble basic amine until it is converted to the ammonium or basic amine salt. The ammonium salt of the N-monoalkyl polymeric amic acid can be isolated by filtration or other means known to the art.

The term "polymeric polycarboxylic acid anhydride" as used herein refers to the interpolymers obtained by condensing a polymerizable organic compound containing an ethylenic double bond as the sole aliphatic carbon-to-carbon unsaturation with an acid anhydride having the formula

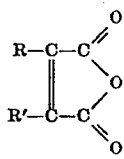

where R and R' are selected from the group consisting of hydrogen, alkyl, aryl, aralkyl and cycloalkyl. Suitable methods for effecting the condensation between the acid anhydride and the polymerizable organic compound are described in U. S. Patents 2,047,398 issued July 14, 1936, and 2,378,629 issued June 19, 1945. In these polymeric acid anhydrides the two recurring non-oxocarbonyl groups are on adjacent carbon atoms. The interpolymers of styrene/maleic anhydride are particularly preferred for use in this invention to form the ammonium salt of N-monoalkyl polymeric styrene/maleamic acid.

Through the employment of the N-monoalkyl substituted polymeric amic acid ammonium or basic amine salts, aqueous dispersions which are stable can be made and which contain up to 75% or more total solids. The exact method for preparing these dispersions will vary to some extent depending upon the material to be dispersed. If the material to be dispersed is a liquid, a practical way for preparing the dispersions is to add it to an aqueous solution of the N-monoalkyl substituted polymeric amic acid ammonium or basic amine salt. If the material to be dispersed is a solid, it is best to blend it with the N-monoalkyl substituted polymeric amic acid ammonium or basic amine salt and then to reduce the blend with water to the desired solids concentration. In some instances it is advantageous to add the material which has been treated with the N-monoalkyl substituted polymeric amic acid ammonium or basic amine salt dispersing agent to water under continuous agitation. Obviously other methods that are known to the art can be used in preparing the dispersions.

In practice, mixers and mechanical stirrers of various types can be used in preparing the dispersions. Suitable mixers are those of the Werner-Pfleiderer type, Banbury type and modifications of these types. The dispersions can also be made employing various types of ball mills and other machines designed to effect dispersion.

In the application of the N-monoalkyl substituted polymeric amic acid ammonium or basic amine salts as dispersing agents the amount which is effective will vary from about 0.5 to 30%, on the weight of the material being dispersed. As a rule, the amount will be in the range of from about 2 to about 15% but the particular amount will vary to some extent depending upon the material being dispersed.

This invention is further illustrated by the following examples in which the amounts, unless otherwise specified, are expressed in parts by weight.

*Example I*

A composition comprising 215 parts of a 10% solution of the ammonium salt of the amic acid obtained by reacting a molar equivalent of low molecular weight styrene/maleic anhydride polymer (having a viscosity of 14 to 70 centipoises at 25% solids in methyl ethyl ketone at 25° C.) with an equal molar amount of a 1/1 molar mixture of n-actadecylamine and n-butylamine, 60 parts of a 25 gallon linseed oil/ester gum varnish, 125 parts of rutile titanium oxide pigment, 228 parts of china clay, and 53 parts of water is milled in a ceramic jar with glass balls for about 2 hours, when a smoothly milled, well dispersed mixture is obtained. The composition thus obtained is brushed on wood and wall board surfaces and the coating allowed to dry at ordinary room temperatures. After drying for several hours, the coatings show excellent resistance to water and are smooth. Upon further aging at room temperature the resistance to water gradually increases so that in two or three days the coatings developed a high degree of resistance to washing with soapy water and to scrubbing. An analogous composition made by the same process but containing casein instead of the amic acid salt is inferior in texture and coatings prepared therefrom are greatly inferior in resistance to water both initially and after aging for 1 to 2 weeks.

Example II

To 207 parts of a mixture consisting of 100 parts of a soya bean oil modified polyhydric alcohol-polycarboxylic acid resin (containing 60% soya bean oil), 88 parts of titanium oxide pigment, 15 parts of butoxy-2-ethanol, 3 parts of cobalt naphthenate (2% cobalt metal), and 1 part of manganese resinate (3% manganese metal) is added gradually with vigorous agitation 112 parts of a 10% solution of the amic acid described in Example I dissolved in ammonium hydroxide. The resulting dispersion has good stability, excellent brushing properties and is easily applied in smooth coatings to glass, wood, paper and fabric substrates. Such coatings show good gloss, excellent leveling properties, and dry rapidly to the tack-free stage. Upon outdoor exposure for 6 months the coatings show good resistance to weathering. An analogous composition made with casein in place of the amic acid has poor dispersion stability and coatings made therefrom are greatly inferior in resistance to water.

Example III

A composition containing 10 parts of a 10% solution of the amic acid of Example I in ammonium hydroxide, 2 parts of titanium oxide pigment, and 3 parts of china clay is milled in a ball mill for 2 hours. The resulting dispersion brushes on wood and glass surfaces to give smooth coatings which, upon drying, develop excellent resistance to water. After drying for about 2 days at room temperature such coatings show no appreciable softening or swelling upon prolonged immersion in water.

Example IV

To 10 parts of a 25 gallon linseed oil/ester gum varnish is gradually added, with vigorous agitation, 33 parts of a 10% solution of N-butyl styrene/maleamic acid (obtained by reacting one mole of n-butylamine with 1 mole equivalent of styrene/maleic anhydride polymer having a viscosity of 95 centipoises as a 15% solution in methyl ethyl ketone at 25° C.), dissolved in dilute ammonium hydroxide. The solution has an alkalinity corresponding to a pH of 9.1. To the resulting varnish dispersion is added 12 parts of titanium oxide pigment, 18 parts of china clay, 8 parts of asbestine, 6 parts of a commercial mica and 20 parts of water and the composition is subjected to ball milling for 2 hours. The resulting dispersion brushes readily on wood, paper and the like surfaces in smooth coatings, which, upon drying, rapidly develop excellent resistance to washing with soapy water. A corresponding coating containing casein in place of the N-butyl styrene/maleamic acid has greatly inferior resistance to water and films prepared therefrom, after drying for several days, are easily removed from the painted surface by washing with soapy water.

Example V

Two hundred parts of an ethylene polymer having a molecular weight of about 17,000 and softening at 105–110° C. is milled in a Banbury mixer at 100° C. To it is added 16 parts of an N-octadecyl/butyl styrene/maleamic acid obtained by reacting one mole of the styrene-maleic anhydride polymer of Example I with one mole of an equimolar mixture of n-octadecylamine and n-butylamine. When the total N-octadecyl/butyl styrene/maleamic acid has been incorporated into the ethylene polymer, the steam in the mixer is turned off, an amount of morpholine is added sufficient to form the morpholine salt of the amic acid and the gradual addition of water containing an additional molar quantity of morpholine is begun. As the temperature of the polymer drops, the water is gradually taken up and a water-in-polymer dispersion is formed. Upon continued gradual addition of water, this dispersion inverts to a thick polymer-in-water dispersion of paste-like consistency. On completion of the process of inversion the solids content of the dispersion is 60–70%. The dispersion can be diluted with water to any desired concentration. The particle size of the dispersion is small and uniform in size ranging between 3 and 4 microns.

A fabric coated with the dispersion prepared as described above and then heated to insolubilize the coating gives a break-down voltage value of 850 volts per mil. Under similar conditions a fabric coated with an ethylene polymer dispersion prepared with polyvinyl alcohol and an alkali metal salt of a sulfated long chain alcohol as the dispersing agent has a break-down voltage of 490 volts/mil.

Example VI

Example V is duplicated using 28 parts of the ammonium salt of N-dodecyl styrene/maleamic acid as a dispersing agent. A fabric coated with the dispersion thus obtained has a breakdown voltage of 933 volts/mil as compared to 490 volts/mil for a fabric coated with an ethylene polymer dispersion prepared with polyvinyl alcohol and an alkali metal salt of a sulfated long chain alcohol as the dispersing agent.

Example VII

Example V is duplicated using instead of polythene alone a blend consisting of 132 parts of an ethylene polymer having an average molecular weight of 17,000 and softening at 105–110° C. and 88 parts of a polyisobutylene having an average molecular weight of 13,000, and as the dispersing agent the ammonium salt of an octadecyl-butyl styrene/maleamic acid, obtained by reacting one mole of the styrene/maleic anhydride polymer of Example I with one mole of an equimolar mixture of n-octadecyl amine and n-butyl amine. The dispersion obtained was applied to a fabric and after insolubilization used as a pressure sensitive adhesive backing.

Example VIII

To 105 parts of a styrene/maleic anhydride polymer, which has a viscosity of 14 centipoises, when measured as a 25% solution in methyl ethyl ketone at 25° C., dissolved in 2000 parts of methyl ethyl ketone is added with stirring a solution of 148 parts of n-dodecylamine in 300 parts of methyl ethyl ketone. After stirring at room temperature for about 4 hours the solution is heated to 50° to 55° C. and held at this temperature until all of the n-dodecylamine has reacted. The extent of reaction may be determined by removing a small portion of the reaction mixture and adding it to dilute ammonium hydroxide. In this test, the product should be completely soluble and give only a faintly cloudy solution, When the reaction of n-dodecylamine is complete a solution of 14.6 parts of n-butylamine in 160 parts of methyl ethyl ketone is added with stirring at a solution temperature of 45° to 50° C. A viscous, homogeneous solution is obtained which gels on cooling. The warm solution is poured slowly into about 4000 parts of an aliphatic hydrocarbon solvent, such as gasoline. The amic acid reaction product is thereby precipitated. The product has dodecyl groups substituted on the nitrogen atoms of about 80% of the total amide groups in the polymer and the residual amide groups have butyl substitution groups.

The product prepared as described above dissolves readily in warm dilute ammonium hydroxide to give solutions which at 10% solids concentration have low viscosity and a somewhat cloudy appearance. Such solutions readily disperse varnishes and alkyd resins, and pigmented compositions based on such dispersions have excellent properties as finishes for wall-paper and the like. A pigment-varnish dispersion comprising 3 parts of varnish, 1 part of the amic acid prepared as above, used as a 10% solution in dilute ammonium hydroxide at pH 8.5, 20 parts of a pigment composition consisting of 5 parts $TiO_2$, 9 parts china clay, 4 parts asbestine, 2 parts mica, and 15 parts of water is prepared by mixing and milling for 2 hours. The dispersion has excellent properties as a wall finish and when brushed over a surface air-dries rapidly. After overnight drying the resulting film may be washed vigorously with soapy water without serious erosion of the finish. A corresponding pigment-varnish emulsion paint made with casein, in place of the amic acid dispersing agent, has poor wet-scrub resistance, even after air-drying for several days.

The preferred polymeric acids for use in the practice of this invention are the products obtained by condensing one mole of maleic anhydride with one mole of styrene and which have viscosities in the range of from 0.2 to 650 centipoises at 25° C., when measured as 15% solutions in methyl ethyl ketone. Examples of other butenedioic acid anhydrides which are suitable are those having the general formula

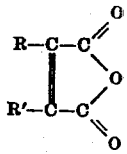

where R and R' are hydrogen atoms or alkyl, aryl, aralkyl, or cycloaliphatic groups, such as methyl, ethyl, propyl, octyl, decyl, phenyl, tolyl, xylyl, benzyl, cyclohexyl and the like. The butenedioic acid anhydride is condensed with a polymerizable organic compound containing an ethylenic double bond as the sole aliphatic carbon-to-carbon unsaturation to form the polymeric acid anhydride. Suitable examples of polymerizable organic compounds of this type are ethylene, propylene, butylene, isobutylene, styrene, indene, vinyl acetate, methyl acrylate, methyl methacrylate and the like. In these polymeric acid anhydrides the two recurring non-oxo-carbonyl groups are on adjacent carbon atoms. The N-alkyl polymeric amic acid is obtained by reacting one mole of a primary alkyl amine with one mole of the polymeric acid anhydride, based on the equivalent molecular weight of the polymeric acid anhydride as being that of the structural unit. The ammonium or basic amine salt is then formed by treatment with ammonia, ammonium hydroxide, or water-soluble basic amine.

The preferred products for use in this invention are the ammonium or basic amine salts of N-alkyl polymeric amic acids obtained by reacting in molar equivalent proportions a styrene/maleic anhydride condensation product having a viscosity of from 6 to 100 centipoises at 25° C., measured as a 15% solution in methyl ethyl ketone, with a 1/1 mole mixture of butyl and octadecyl amines.

In the application of the dispersions of this invention to produce water-insensivity, it is sometimes desirable to convert the N-alkyl polymeric amic acid ammonium or basic amine salt to the methylol derivative since in that way optimum effects may be obtained.

Materials which can be dispersed satisfactorily in water through the use of the N-alkyl polymeric amic acid ammonium or basic amine salts of this invention include drying, semi-drying and nondrying oils, for example linseed oil, China-wood oil, oiticica oil and corn oil; oil modified polyhydric alcohol-polycarboxylic acid resins; natural and synthetic waxes, for example paraffin waxes, carnauba wax, beeswax and ceresin; synthetic polymers, such as polyethylenes, polyisobutylenes, polyamides, polyvinyl esters, ethers, acetals, polyvinyl chloride, polyvinylidene chloride, poly(2-chlorobutadiene-1,3), butadiene/acrylonitrile polymers, and butadiene/styrene polymers; natural polymers, such as rubber, balata, and gutta percha; modified natural polymers, for example cellulose esters and ethers, such as cellulose nitrate, cellulose acetate, ethyl cellulose, and crotyl cellulose; natural and synthetic asphalts; clays and pigments, for example titanium oxide and iron oxide; water-insoluble dyes and lakes; and sulfur and other water-insoluble fungicides and bactericides. The term film-forming composition as used herein includes compositions containing these and similar materials.

The dispersions used in the practice of this invention, because of their ability to become insoluble in water and also water-insensitive upon drying, are useful as protective and decorative coatings for all sorts of materials. Through the use of the transitory dispersing agents of this invention, it is possible to prepare aqueous dispersions from which films can be deposited which are remarkably resistant to washing after drying in the air or after baking at elevated temperatures. They are particularly useful for rendering bibulous materials, such as textiles, paper and the like, water-insensitive. They are also useful in the treatment of pigments to render said pigments easily dispersible in water by simple stirring. These dispersions are exceptionally useful in fields employing polymer coatings applied from aqueous dispersion systems where there is great need for compositions which become truly insensitive to water after air-drying or heat treatments. For example, these polymer coatings containing the dispersing agents of this invention are exceptionally useful for electrical insulation finishes which must have high resistance to water in order to show high voltage breakdown strengths.

As many apparently widely different embodiments of this invention may be made without departing from the spirit and scope thereof, it is to be understood that I do not limit myself to the specific embodiments thereof except as defined in the appended claims.

I claim:

1. A composition containing in aqueous dispersion the ammonium salt of N-dodecyl polymeric styrene/maleamic acid.

2. A composition containing in aqueous dispersion a salt of the class consisting of ammonium and basic amine salts of an N-monoalkyl substituted polymeric amic acid of an interpolymer of a polymerizable organic compound containing an ethylenic double bond as the sole aliphatic carbon-to-carbon unsaturation with a butenedioic acid anhydride, the recurring two non-oxo carbonyl groups in said polymeric acid being attached directly to adjacent carbon atoms of the polymeric chain, said polymeric amic acid containing structural units in which amide nitrogen atoms have attached thereto hydrogen and a long-chain monoalkyl substituent of at least seven carbon atoms, the basic amine salts being those of amines having an ionization constant value greater than $1 \times 10^{-6}$ when measured at 25° C. and being soluble to the extent of at least 5 parts per 100 parts of water at 25° C.

3. A composition as set forth in claim 2 in which said salt is the ammonium salt and the polymerizable organic compound containing an ethylenic double bond as the sole aliphatic carbon-to-carbon unsaturation is styrene.

4. A composition as set forth in claim 2 in which said salt is the ammonium salt and the butenedioic acid anhydride is maleic acid anhydride.

5. An article having a dried coating of the composition set forth in claim 2.

6. A composition containing in aqueous dispersion a basic amine salt of an N-monoalkyl substituted polymeric styrene/maleamic acid containing structural units in which amide nitrogen atoms have attached thereto hydrogen and a long-chain monoalkyl substituent of at least seven carbon atoms, the basic amine salt being that of an amine having an ionization constant value greater than $1 \times 10^{-6}$ when measured at 25° C. and being soluble to the extent of at least 5 parts per 100 parts of water at 25° C.

7. A fabric having a baked coating of the composition set forth in claim 8.

8. A composition containing in aqueous dispersion of the ammonium salt of an N-monoalkyl substituted polymeric styrene/maleamic acid containing structural units in which amide nitrogen atoms have attached thereto hydrogen and a long-chain monoalkyl substituent of at least seven carbon atoms.

MARTIN E. CUPERY.

REFERENCES CITED

The following references are of record in the file of this patent:

UNITED STATES PATENTS

| Number | Name | Date |
|---|---|---|
| 1,976,679 | Fikentscher | Oct. 9, 1934 |